United States Patent [19]

Bücker

[11] Patent Number: 5,492,090
[45] Date of Patent: Feb. 20, 1996

[54] VALVE FOR THE REVERSE-FLOW FLUSHING OF TEAT CUPS IN MILKING MACHINERY

[75] Inventor: Heinrich Bücker, Langenberg, Germany

[73] Assignee: Westfalia Separator AG, Oelde, Germany

[21] Appl. No.: 302,654
[22] PCT Filed: May 21, 1993
[86] PCT No.: PCT/EP93/01273
 § 371 Date: Sep. 1, 1994
 § 102(e) Date: Sep. 1, 1994
[87] PCT Pub. No.: WO94/02000
 PCT Pub. Date: Feb. 3, 1994

[30] Foreign Application Priority Data

Jul. 21, 1992 [DE] Germany .......................... 42 24 001.8

[51] Int. Cl.⁶ ..................................................... A01J 5/00
[52] U.S. Cl. ....................................... 119/14.01; 119/14.18
[58] Field of Search ........................... 119/14.01, 14.02, 119/14.32, 14.35, 14.18, 14.54, 14.55

[56] References Cited

U.S. PATENT DOCUMENTS 1,854,307  4/1932  Hapgood ............................... 119/14.01

FOREIGN PATENT DOCUMENTS 1259133  1/1968  Germany .......................... 119/14.01

*Primary Examiner*—Thomas Price
*Attorney, Agent, or Firm*—Sprung Horn Kramer & Woods

[57] ABSTRACT

A valve for the reverse-flow flushing of teat cups in milking machinery has a housing with an interior and a channel to the atmosphere. The housing has three connections, a first connection for connecting with the teat cups, a second connection for connecting with the milk line and a third connection for connecting with the reverse-flow flush line. A disk is mounted for rotation in the interior of the housing and has channels permitting communication through the interior of the housing between the first and second connections and blocking the third connection when the disk is in the milking position, permitting communication through the interior of the housing between the first and third connections and blocking the second connection when the disk in the reverse-flow position and permitting communication through the interior of the housing between the first and second connections while blocking the third connection and the channel when the disk is in the rinsing position.

4 Claims, 2 Drawing Sheets

VALVE FOR THE REVERSE-FLOW FLUSHING OF TEAT CUPS IN MILKING MACHINERY

BACKGROUND OF THE INVENTION

The invention concerns a valve for the reverse-flow flushing of teat cups in milking machinery. It includes a housing with an interior that accommodates a moving part in the form of a rotating disk. The housing has three connections. The first connection connects with the teat cups, the second with the milk line, and the third with a reverse-flow flush line. When the valve is set for milking, the first connection communicates through it with the second connection, and the third connection is blocked. When the valve is set for reverse-flow flushing, the first connection communicates through it with the third connection, and the second connection is blocked.

A valve of this type is known from U.S. Pat. No. 4,168,677. Such a valve must prevent reverse-flow flush from leaking into the teat cups or the milk line when the valve is set for milking and is loose. This requisite is ensured in the known valve in that the housing is open to the atmosphere, allowing flush to escape when the valve leaks. It is on the other hand impossible to prevent milk from accumulating on the surface of the valve. Such an accumulation will promote the propagation of germs to the detriment of the product. It is accordingly impossible to maintain satisfactory hygiene very long without occasionally taking the equipment apart and rinsing it manually.

SUMMARY OF THE INVENTION

The object of the present invention is a valve that can be maintained hygienic for a long time without manual intervention.

This object is attained in accordance with the present invention in that, while the valve is set for rinsing, the moving part assumes a position wherein the first and second connections communicate with the interior of the housing, the third connection is blocked, and a channel between the interior and the atmosphere is also blocked.

Since the housing is sealed off from the atmosphere and the first and second connections communicate with the interior of the housing when the valve is set for rinsing, both the moving part and the interior will be saturated with rinse suctioned in through the first connection due to a vacuum at the second connection. The moving part and the interior will accordingly be maintained unexceptionably hygienic for a long time.

One advantageous embodiment of the present invention is characterized in that the housing is in two halves, in that the channel between the interior and the atmosphere is accommodated between them, in that the two halves of the housing leave the channel unblocked while the valve is set for either milking or reverse-flow flushing, in that the connections into the interior can be positioned tight against flat surfaces on the moving part in the form of a rotating disk, in that the first connection communicates through channels in the disk with the second connection when the valve is set for milking and with the third connection when the valve is set for reverse-flow flushing, in that each flat surface has a depression that the first and second connections open into as long as the valve is set for rinsing, and in that the depressions allow one half of the housing to move toward the other while the valve is in that setting into a position that blocks off the channel between the interior and the atmosphere. This embodiment is particularly cost-effective.

The two halves of the housing in another advantageous embodiment are held together by a spring that forces them together while the valve is set for rinsing.

The moving part of the valve is actuated in a practical way by a piston-and-cylinder mechanism. This mechanism advances and retracts a rack that engages a pinion mounted on a journal that projects out of the moving part and the housing.

Embodiments of the present invention will now be specified with reference to the drawing, wherein

DETAILED DESCRIPTION OF THE INVENTION

Figure 1:
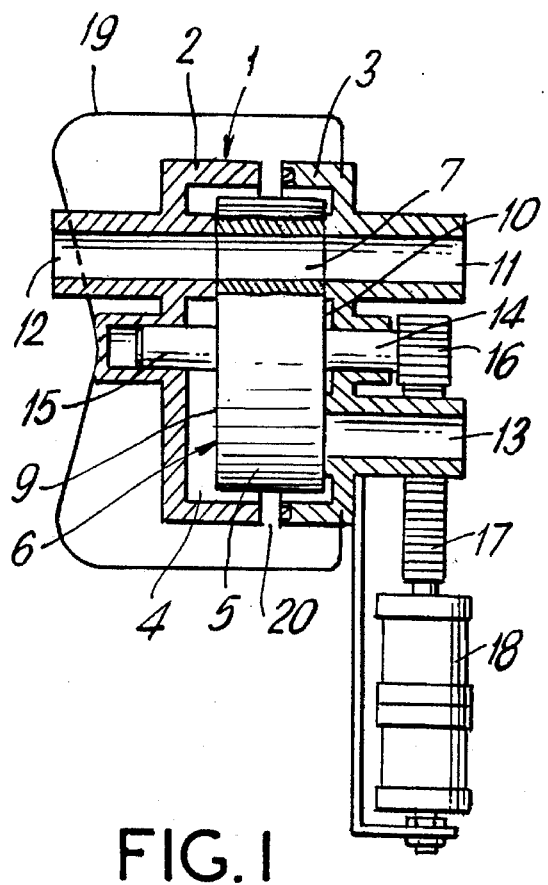
FIG. 1 illustrates the valve set for milking.

The housing 1 illustrated in FIG. 1 comprises halves 2 and 3. Between the two halves is an interior 4. Interior 4 accommodates a moving part 6 in the form of a disk 5 that rotates on journals 14 and 15. Disk 5 is provided with flat surfaces 9 and 10 and with channels 7 and 8 that extend between them. Housing 1 is provided with connections 11, 12, and 13 that can be connected to channels 7 and 8. Connection 11 connects with unillustrated teat cups, connection 12 with an unillustrated milk line, and connection 13 with an unillustrated reverse-flow flush line. Mounted on the end of journal 14 is a pinion 16. Pinion 16 engages a rack 17. Rack 17 is advanced and retracted by a piston-and-cylinder mechanism 18. Housing halves 2 and 3 are held together by a spring 19. When rotating disk 5 is in a certain position it creates between the two halves a channel 20 that the interior 4 of housing 1 communicates with the atmosphere through.

Referring now to FIGS. 1–6 when moving part 6 is in the position illustrated in FIG. 1, connection 11 communicates with connection 12 through channel 7. Milk can accordingly flow unimpeded from the teat cups to the milk line.

Figure 2:
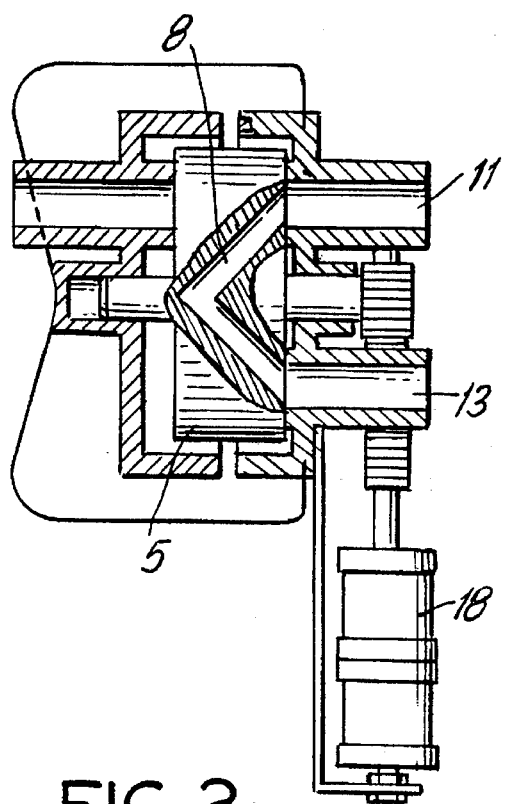
FIG. 2 illustrates the valve set for reverse-flow flushing.

To set the valve for reverse-flow flushing, piston-and-cylinder mechanism 18 is actuated and rotates disk 5 into the position illustrated in FIG. 2. Connection 11 now communicates with connection 13 by way of channel 8. Flush can accordingly flow back through the teat cups.

Figure 3:
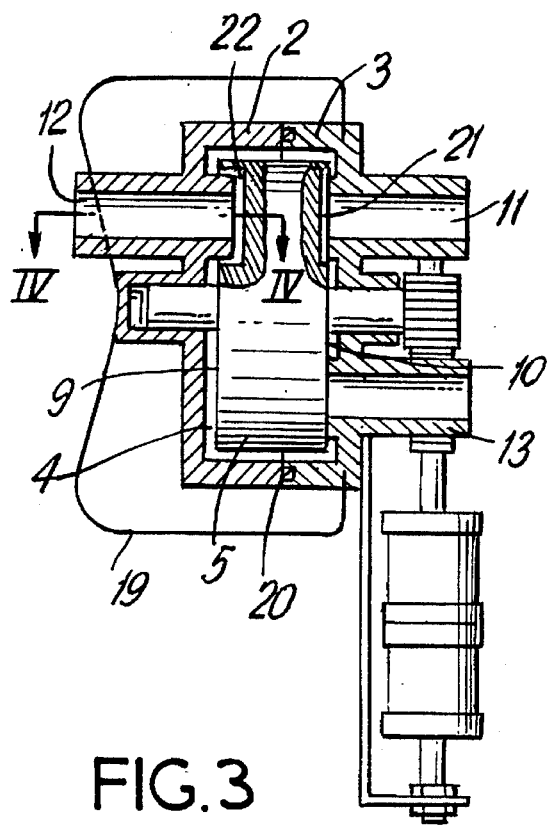
FIG. 3 is the valve set for rinsing.

Before the overall mechanism is rinsed, disk 5 is rotated into the position illustrated in FIG. 3. There are depressions 21 and 22 in the disk's flat surfaces 9 and 10. Connections 11 and 12 open into depressions 21 and 22 when the valve is in this position. Depression 22 accommodates the section of connection 12 that extends into the interior 4 of housing 1, allowing half 2 to rest tight against half 3 and block off the channel 20 that leads to the atmosphere. The rinse flowing through the machinery arrives in interior 4 through connection 11 and depression 21 and leaves through depression 22 and connection 12. Both interior 4 and disk 5 are accordingly thoroughly rinsed.

Figure 4:
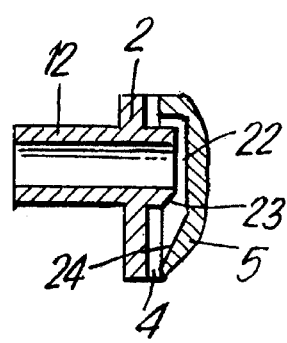
FIG. 4 is a section along the line IV—IV in FIG. 3.
Figure 5:
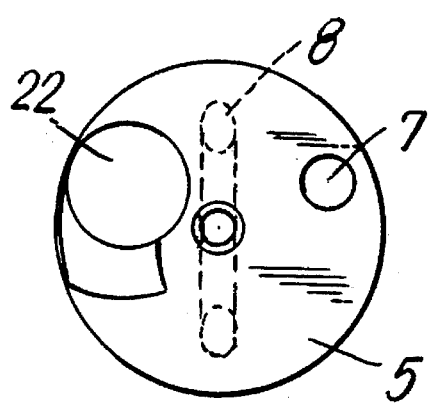
FIG. 5 is a front view of the disk of FIGS. 1–3.
Figure 6:
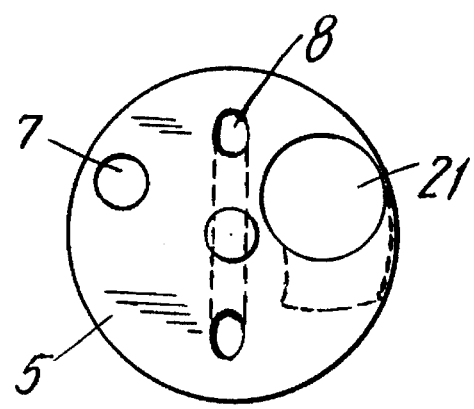
FIG. 6 is a rear view of the disk of FIGS. 1–3.

As will be evident from FIG. 4, the section of connection 12 that extends into interior 4 is provided with a bevel 23 and depression 22 with a bevel 24. This design automatically displaces housing half 2 as disk 5 rotates into either the milking or the reverse-flow flushing position.

Housing can also be in one piece instead of two halves and accommodate a part that communicates with the atmosphere and is opened by the rotating disk while the valve is set for either milking or reverse-flow flushing and closed by the disk while the valve is set for rinsing.

I claim:

1. A valve for the reverse-flow flushing of teat cups in milking machinery, comprising: a housing with an interior and a channel to the atmosphere; a disk mounted for rotation in the interior of the housing; wherein the housing has three connections, a first connection for connecting with teat cups, a second connection for connecting with the milk line, and a third connection for connecting with a reverse-flow flush line, wherein the disk is rotatable into a milking position, into a reverse-flow position and into a rinsing position and wherein the disk has means permitting communication through the interior of the housing between the first and second connections and blocking the third connection when the disk is in the milking position, permitting communication through the interior of the housing between the first and third connections and blocking the second connection when the disk is in the reverse-flow position and permitting communication through the interior of the housing between the first and second connections while blocking the third connection and the channel when the disk is in the rinsing position.

2. The valve as recited in claim 1, wherein the housing comprises two halves, wherein the channel between the interior and the atmosphere is accommodated between the two halves and wherein the disk leaves the channel unblocked while in the milking and reverse-flow positions, wherein the connections into the interior are positioned tight against flat surfaces on the disk, wherein the means permitting communication comprises channels in the disk through which the first connection communicates with the second connection when the disk is in the milking position and with the third connection when the disk is in reverse-flow position, wherein each flat surface has a depression that the first and second connections open into when the disk is in the rinsing position, and wherein the depressions allow one half of the housing to move toward the other while the disk is in the rinsing position.

3. The valve as in claim 2, further comprising a spring holding the two halves of the housing together and that forces them together while the disk is in the rinsing position.

4. The valve as is claim 1, further comprising journals for mounting the disk for rotation and wherein an end of one of the journals projects out of the housing, a pinion mounted on the end of the journal, a rack engaging the pinion and a piston-and-cylinder mechanism connected to the rack for advancing and retracting the rack on the pinion.

* * * * *